(12) United States Patent
Saito et al.

(10) Patent No.: US 6,451,473 B1
(45) Date of Patent: Sep. 17, 2002

(54) NON-AQUEOUS ELECTROLYTE SECONDARY BATTERY AND METHOD OF MANUFACTURING THE SAME

(75) Inventors: Susumu Saito; Takayuki Inoi, both of Tokyo (JP)

(73) Assignee: NEC Tokin Corporation (JP)

( * ) Notice: Subject to any disclaimer, the term of this patent is extended or adjusted under 35 U.S.C. 154(b) by 159 days.

(21) Appl. No.: 09/585,168

(22) Filed: Jun. 1, 2000

(30) Foreign Application Priority Data

Jun. 1, 1999 (JP) ............................................. 11-153691

(51) Int. Cl.⁷ ............................................. H01M 10/04
(52) U.S. Cl. ........................................ 429/94; 429/159
(58) Field of Search ................................... 429/94, 159

(56) References Cited

U.S. PATENT DOCUMENTS

| | | | | |
|---|---|---|---|---|
| 4,943,497 A | * | 7/1990 | Oishi | 429/53 |
| 5,376,467 A | * | 12/1994 | Abe | 429/7 |
| 5,567,539 A | * | 10/1996 | Takahashi | 429/57 |
| 5,731,098 A | * | 3/1998 | Suzuki | 429/53 |
| 6,033,795 A | * | 5/2000 | Broussely | 429/56 |

FOREIGN PATENT DOCUMENTS

| | | | |
|---|---|---|---|
| JP | 9-35701 | 2/1997 | ............ H01M/2/26 |
| JP | 10-154530 | 6/1998 | .......... H01M/10/40 |
| JP | 11-121035 | 4/1999 | .......... H01M/10/40 |
| JP | 11-135151 | 5/1999 | .......... H01M/10/40 |

* cited by examiner

Primary Examiner—Patrick Ryan
Assistant Examiner—Mark Ruthkosky
(74) Attorney, Agent, or Firm—Hayes Soloway P.C.

(57) ABSTRACT

In a non-aqueous electrolyte secondary battery in which a battery element which is constructed by forming an anode active material layer and a cathode active material layer on an anode collecting body and a cathode collecting body, respectively, and laminating and winding them together with two separators, is housed in a battery can. An electrical connecting member for electrical connection between an inner electrode lead and an external terminal is designed to have spring property so that a winding core is pressurized and fixed to the center of the battery can, and the battery is structured such that connection between the inner lead and the connecting member can be made on an end face of the winding core inside of the battery can.

20 Claims, 4 Drawing Sheets

US 6,451,473 B1

NON-AQUEOUS ELECTROLYTE SECONDARY BATTERY AND METHOD OF MANUFACTURING THE SAME

BACKGROUND OF THE INVENTION

1. Field of the Invention

The present invention relates to a non-aqueous electrolyte secondary battery, and more particularly, to a cylindrical lithium secondary battery having a structure suitable for mass production, and to a method of manufacturing the same.

2. Description of the Prior Art

Instead of a battery using an aqueous electrolyte, such as a lead battery or nickel cadmium battery, a secondary battery using a non-aqueous electrolyte has been used. As compared with a conventional secondary battery using an aqueous electrolyte, a non-aqueous electrolyte secondary battery has a large volume or a large density in weight and capacity. In addition, since high voltage can be obtained, the non-aqueous electrolyte secondary battery is expected to be used for various uses, for example, a power supply for not only a small-sized equipment but also for a large-sized apparatus.

As typified by a lithium ion secondary battery using an anode to which lithium can be doped or from which lithium can be de-doped, and a cathode containing transition metal oxide, the non-aqueous electrolyte secondary battery is manufactured in the following manner. A belt-shaped anode made of a belt-shaped anode collecting body coated with an anode active material and a belt-shaped cathode made of a belt-shaped cathode collecting body coated with a cathode active material are laminated together with two separators to form a laminate. The laminate is spirally wound to form a cylindrical battery element called a jelly roll. The jelly roll is provided with cathode and anode inner leads and is housed in a battery can so as to be electrically connected to the outer terminal of the battery can. Then, a predetermined electrolyte is injected into the battery can prior to sealing the battery can.

Such a cylindrical battery element is superior in sealing property. Moreover, since any portions are brought into contact with each other under an equal pressure, the cylindrical battery has a feature that it is possible to perform a uniform battery reaction irrespective of a place of the battery element. Thus, not only in a portable secondary battery, but also in use of a large battery used for the purpose of generating large current, the cylindrical battery occupies an important position, and is expected also as a large battery for a power source of an electric car, an electrically assisted bicycle, or the like.

An example of such a cylindrical battery is disclosed in the U.S. Pat. No. 4,943,497, which is structured such that the foregoing spirally wound battery element or a jelly roll is housed in a cylindrical battery can. An external cathode terminal member is attached to a sealing side through an insulating gasket, and the battery can is used as an anode terminal. An anode inner lead of the jelly roll is electrically connected to an inner wall of the battery can, and a cathode inner lead of the jelly roll is electrically connected to the external cathode terminal member. The cathode terminal member has a structure provided with a safety vent for releasing an inner pressure at the time of an abnormal pressure rise in the inside of the battery can, and a cathode inner lead is welded to the safety vent to make electrical connection between the battery element and the external terminal. Like this, for the purpose of making conduction between the inner lead and the external terminal, instead of directly connecting both, electrical conduction is made through a conductive connecting member such as the safety vent. As a welding operation for that, it is necessary to weld a battery header to the cathode lead before sealing.

In the above mentioned U.S. patent, after the center of the safety vent and the tip end of the cathode lead are welded by using an ultrasonic welding method, they are housed in the battery can while the long and thin cathode lead is folded. Since the welding operation is generally performed at the outside of the battery can, the cathode lead must be designed to have an enough length to extend outside of the battery can.

However, the housing step of folding such a long lead within the battery can requires skill so as not to cause a short circuit accident, thus the skill-needed folding operation is not suitable for mass production. Furthermore, the foregoing housing step makes it difficult to achieve a high reliability of the product.

SUMMARY OF THE INVENTION

An object of the present invention is therefore to provide a non-aqueous electrolyte secondary battery having a structure which facilitates fabrication and is suitable for mass production, and further, which has high reliability, and a method of manufacturing the same.

According to a non-aqueous electrolyte secondary battery of the present invention, the secondary battery has such a structure that an inner lead of a rolled battery element housed in a container is electrically connected to an external terminal member provided at a sealing side of the container through an relay member, and is characterized in that the connecting member is designed so as to pressurize and fix a winding core of the rolled battery element, and includes a protruding surface enabling electrical connection between the connecting member and the inner lead by pressing the inner lead to an end face of the winding core.

Especially, for the purpose of facilitating a welding operation of the inner lead, it is preferable that the end face of the winding core protrudes from a winding end face of the battery element to a side of the protruding surface of the connecting member. Besides, it is preferable to provide a plurality of inner leads since inner resistance can be lowered.

It is also a feature that the conductive connecting member includes an annular flange structure along an inner periphery of the container at a side separate from the protruding surface. Besides, it is a feature that a heat-resistant member is joined with the end face of the winding core.

Moreover, according to the present invention, a method of manufacturing a non-aqueous electrolyte secondary battery comprises a step of housing a rolled battery element including a winding core at a center portion, a cathode side lead, and an anode inner lead into a container for a battery can so that an end face of the winding core is exposed at a sealing side, a step of disposing one side of the inner lead on the end face of the winding core and joining the one side of the inner lead to a protruding surface of a conductive connecting member using the end face of the winding core as abase, and a step of disposing and sealing an external terminal member at:the sealing side of the container so that the external terminal member is electrically connected to an end portion of the conductive connecting member.

This manufacturing method is also characterized in that the joining step is ultrasonic welding, the method further comprises a step of forming a support protrusion portion for supporting the conductive connecting member at an inner surface of the container prior to the ultrasonic welding step, and the ultrasonic welding is performed in a state where the conductive connecting member is held by the support protrusion portion. Moreover, this method is characterized in that a cylindrical gasket is provided between the support protrusion portion and the conductive connecting member, and in that the method further comprises a step of disposing the external terminal member on the conductive connecting member through a safety vent at an inner side of the gasket, and a step of joining the external terminal member, the safety vent, and the conductive connecting member by crimping an open end of the container together with the gasket. Moreover, the method is characterized by comprising a step of forming a base by joining a heat-resistant member to the end face of the winding core prior to positioning the inner lead on the end face of the winding core, and a step of folding and disposing the inner lead on the heat-resistant member.

Particularly, according to the present invention, there is provided a method of manufacturing a non-aqueous electrolyte secondary battery including a battery element housed in a battery can, the battery element being constructed by forming a cathode active material layer and an anode active material layer on a cathode collecting body and an anode collecting body, respectively, and laminating and winding them through a separator, the method of manufacturing the non-aqueous electrolyte secondary battery comprising the steps of folding part, to be jointed, of a plurality of electrode leads joined to the battery element housed in the battery can so as to be positioned at an upper end portion of a winding core of the battery component, putting a conductive connecting member on a gasket fixed to an upper portion of the battery can, welding the part, to be joined, of the plurality of electrode leads to a joint portion of the conductive connecting member while the upper end portion of the winding core is used as a base, and sealing the battery can in a state where the conductive connecting member is brought into contact with a battery header.

DETAILED DESCRIPTION OF THE PREFERRED EMBODIMENTS

Figure 1:
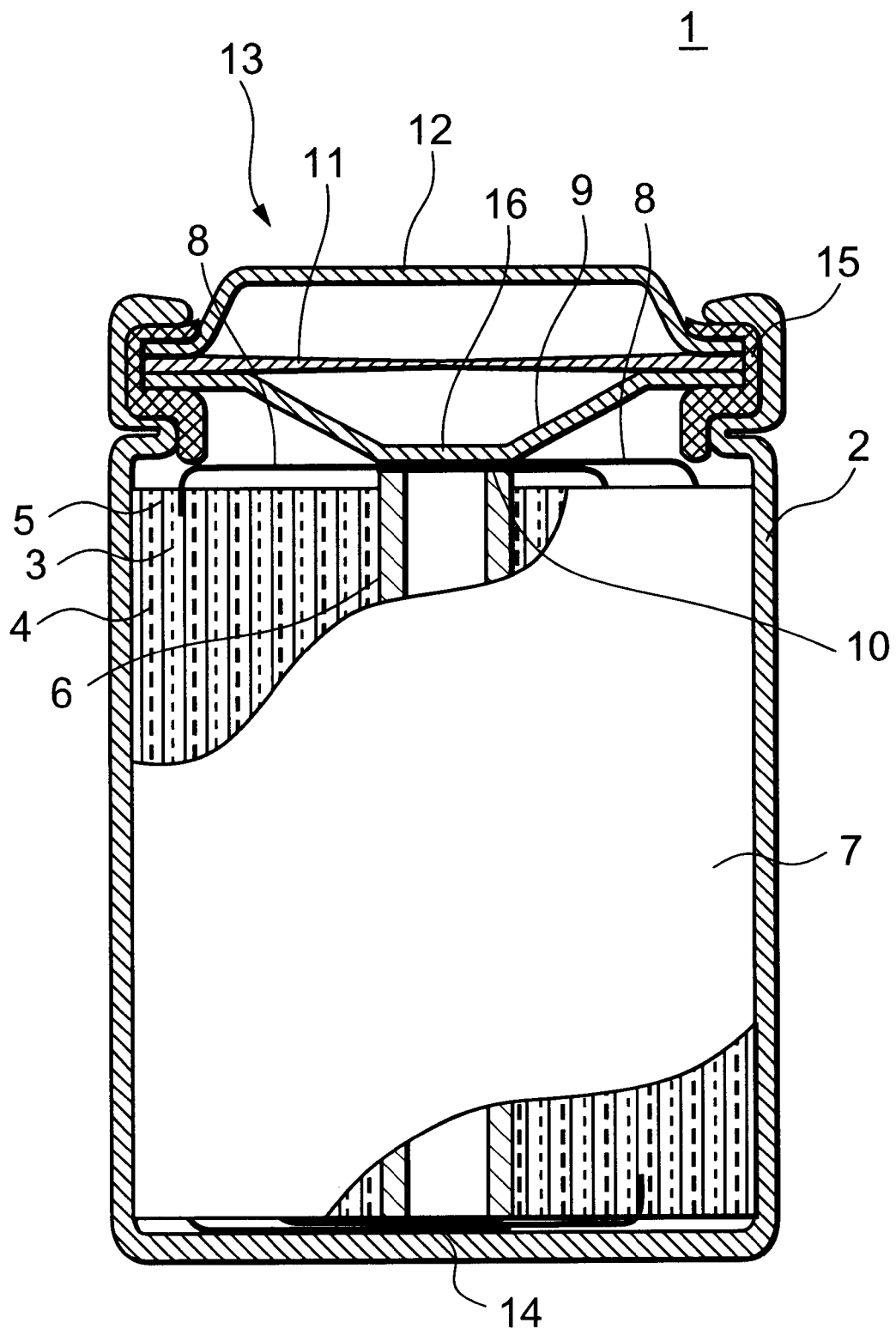
FIG. 1 is a cross-sectional view showing an embodiment of a non-aqueous electrolyte secondary battery according to the present invention.

Referring to FIG. 1, a non-aqueous electrolyte secondary battery 1 of the present invention includes, in an inside of a battery can 2, a battery element 7 in which a cathode electrode 3 formed by coating a cathode active material of a composite oxide of lithium and at least one: kind of transition metal, such as lithium cobalt oxide, lithium manganese oxide, or lithium nickel oxide, on a cathode collecting body of aluminum foil, and an anode electrode 4 formed by coating an anode active material of carbon material, metal composite oxide, or the like, to which lithium can be doped or from which lithium can be de-doped, on an anode collecting body of copper foil or the like are laminated together with a pair of porous separators 5 and are wound using a winding core 6.

The cathode electrode 3 of the battery element 7 is connected with a plurality of inner leads 8 for the cathode electrode to reduce its internal resistance, and one end of each of the inner leads 8 is joined to a protruding surface of a plate conductive connecting member 9, which is inserted from the upper portion of the battery can and has an almost V-shaped section, by welding with an upper end portion 10 of the winding core 6 as a base. The conductive connecting member 9 is conductively connected with a safety vent 11 for releasing an inner pressure at the time of an abnormal rise of pressure in the inside of the battery can and a cathode terminal 12 as an external terminal, to form a battery header 13, and is sealed with a gasket 15.

On the other hand, at a side opposite to the side where the inner leads 8 of the battery element are connected, a plurality of anode conductive leads 14 are connected to the anode electrode 4, and the plurality of anode conductive leads 14 are directly joined to the inner wall of the battery can 2 at the lower portion of a winding body, so that conductive connection is made without taking out an anode conductive tab from the anode electrode.

At the lower end of the winding core, as shown in the drawing, the plurality of anode leads 14 may be pressed to the center of the bottom of the battery can, or the connection portion between the anode conductive leads. 14 and the battery can is made a place except for the bottom center of the battery can and the lower end face of the winding core may be made to directly come in contact with the bottom of the battery can.

Like this, since the cathode inner leads of the rolled battery element provided with the winding. core at the center portion are structured such that they are pressed to the end face of the winding core by the connecting member, the connecting member has not only an electrical connecting function between the inner leads and the external terminal but also a function to fix and dispose the winding core at the center of the battery can. Furthermore, since such a structure is adopted that the inner leads and the connecting member are joined to each other by ultrasonic welding or the like with the end face of the winding core as the base, joining of the inner leads and the connecting member can be made in the state where they are disposed inside of the battery can. Thus, since not only it becomes unnecessary to lengthen the inner leads more than needed, but also it becomes unnecessary to perform a step of housing the inner leads into the container while they are folded, fabrication becomes easy and the structure is suitable for mass production.

Especially, in the present invention, as shown in the drawing, since the end face of the winding core protrudes from the winding end face, adverse influence of heat or the like on the battery element portion can be reduced. Besides, since the connecting member is so designed that the protruding surface of the connecting member 9 pressurizes the end face of the winding core, such a structure is made that when the external terminal is crimped and sealed, the winding core can be firmly fixed to the center of the battery can. Since the winding core is fixed to the center of the battery container in this way, it is possible to make a battery having high reliability in which deterioration of characteristics or change of characteristics is hardly occurred.

On the other hand, according to the structure disclosed in the foregoing U.S. patent, the end face of the winding core retracts inside of the end face of the battery element, and the patent does not disclose or suggest anything as to the usage of the winding core as in the present invention. Besides, in the structure in which an elongated electrode lead is housed while it is folded, since current of the battery element is concentrated on the lead, there are problems that IR loss is large and high efficiency discharge cannot be made. On the other hand, in the present invention, since the plurality of leads is together welded to the conductive connecting member on the winding core, IR loss is small.

Incidentally, Japanese Patent Application Laid-open No. Hei 9-35701 discloses a technique in which a plurality of inner electrode leads is provided to reduce internal resistance, and a winding core is used as an intermediary point to an external terminal member. However, although the plurality of leads are joined to an end face of the winding core, such a structure is adopted that one elongated lead is further extended from that, and when the lead is housed in a battery can, it is necessary to fold the elongated lead as explained in the prior art. Thus, this publication does not suggest any solution to the foregoing problems.

Like this, according to the present invention, since such structure is adopted that after the inner leads attached to the battery element are joined to the conductive connecting member in the battery container by using the core portion of the winding core of the battery element, conductive connection can be made by bringing the conductive connecting member into contact with the battery header, the step of conductive connection becomes simple, and the IR loss or the like due to the electrode lead for making connection with the battery header portion can be reduced. Thus, it is possible to obtain a non-aqueous electrolyte secondary battery in which the IR loss is lowered, capacity density is large, and fabrication is easy. Incidentally, the battery header mentioned here is a member for constructing an external terminal at a sealing side, and means a conductive member crimped to a battery can at a sealing step of the sealing side, which has a structure in which a member such as is integrated as needed.

In the description of the foregoing embodiment, although the embodiment in which the connecting member is provided at only the cathode side has been described, the battery can may be structured such that sealing portions are provided at both ends, and an anode side may also be structured such that as in the foregoing embodiment, an anode side inner lead is connected to an anode side external terminal through an connecting member.

Next, the conductive connecting member 9 formed by deforming and machining a plate member and adopted in the present invention will be described in more detail with reference to FIG. 2 to FIG. 5.

Figure 2A:
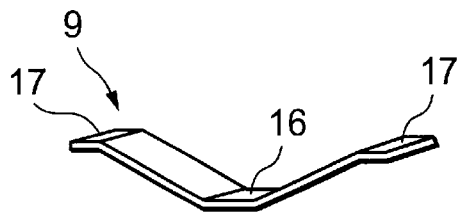
FIG. 2A is a perspective view showing a first example of a conductive connecting member adopted in a battery of the present invention.
Figure 2B:
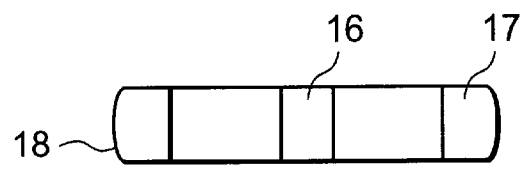
FIG. 2B is a plan view of FIG. 2A.

As shown in FIG. 2A and FIG. 2B, the conductive connecting member 9 according to a first embodiment of the present invention includes, at its center portion, a joining portion 16 to an inner electrode lead positioned at an upper end portion of a winding core, includes, at both ends, conductive connection portions 17 to a battery header constructing a safety vent or the like, and is formed by folding and machining a metal plate so that conductive connection can be made by bringing both the ends into contact with the battery header. The member is subjected to spring machining so that the joining portion 16 can press the inner lead to an end face of the winding core in the inside of a battery can. Besides, it is preferable that an end face 18 of the conductive connection portion 17 is made to coincide with the shape of an inner wall surface of a gasket, such as an arc shape, and is brought into close contact with the inner wall surface of the gasket.

Figure 3A:
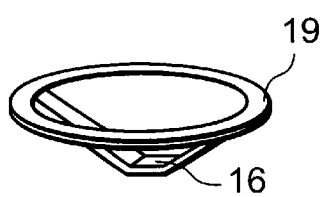
FIG. 3A is a perspective view showing a second example of a conductive connecting member adopted in a battery of the present invention.
Figure 3B:
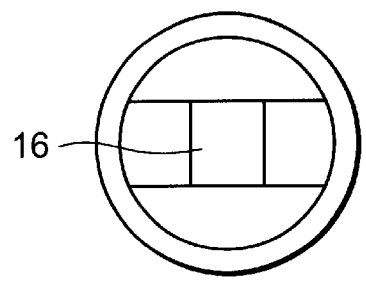
FIG. 3B is a plan view of FIG. 3A.

FIG. 3A and FIG. 3B show a conductive connecting member according to a second embodiment of the present invention, and includes an annular conductive connection portion 19 and a joining portion 16 to an electrode lead, which is connected with the annular conductive connection portion and is similar to that of FIG. 2A. In the conductive connecting member shown in FIG. 2A and FIG. 2B, since the contact portion to a structural member of the battery header and the gasket becomes thick, and a deformation amount of the gasket used for sealing becomes different, it becomes necessary to use a thick member so that leakage from a sealing portion does not occur even if the deformation amount becomes different. On the other hand, in the case where the conductive connecting member shown in FIG. 3A and FIG. 3B is used, since it comes in contact with the gasket at all the circumferential portion of the annular conductive connection portion, certain sealing can be easily realized.

Figure 4A:
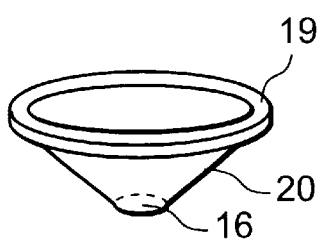
FIG. 4A is a perspective view showing a third example of a conductive connecting member adopted in a battery of the present invention.
Figure 4B:
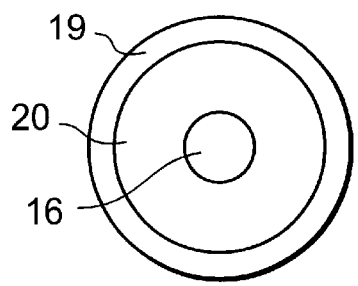
FIG. 4B is a plan view of FIG. 4A.

FIG. 4A and FIG. 4B show a conductive connecting member according to a third embodiment of the present invention. The conductive connecting member includes an annular conductive connection portion 19 and a truncated cone-shaped wall surface 20 connected thereto, and includes a joining portion 16 to an electrode lead at a top of the truncated cone. Since this conductive connecting member includes the annular conductive connection portion 19, it has an effect equivalent to the conductive connecting member shown in FIG. 3A and FIG. 3B in the sealing performance, and further, since the joining portion 16 and the annular conductive connection portion 19 are joined to each other through all over the surfaces,. the IR loss between the joining portion 16 and the annular conductive connection portion 19 can be made further small.

Figure 5A:
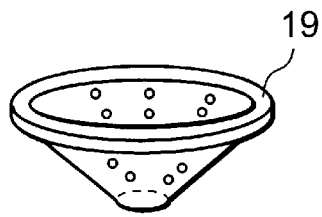
FIG. 5A is a perspective view showing a fourth example of a conductive connecting member adopted in a battery of the present invention.
Figure 5B:
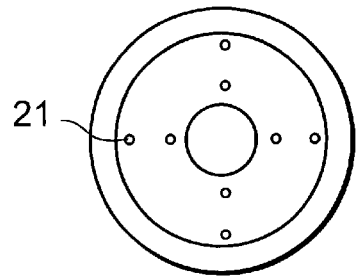
FIG. 5B is a plan view of FIG. 5A.

FIG. 5A and FIG. 5B show a conductive connecting member according to a fourth embodiment of the present invention. A truncated cone-shaped wall surface 20 includes opening portions 21. Since the opening portions are included, gas produced at the time of an abnormal battery reaction quickly passes through and can operate a safety vent, so that the safety can be improved. The opening portion 21 can be shaped into not only a circle but also any shape, and it is preferable that the area of the opening portion is increased within the range where impedance is not increased, since a flow path through which the gas passes becomes large, and the weight of the battery can be decreased.

It is preferable that the conductive connecting member of the present invention is made of the same metal material as an electrode lead. In the case where the connecting member is joined to a connection portion of an electrode lead connected with a cathode side, it is preferable to use aluminum or its alloy similar to the material of the electrode lead at the cathode side. It is possible to use what is obtained by press molding of aluminum or its alloy.

Besides, in the battery of the present invention, connection between the electrode lead and the conductive connecting member at the upper end portion of the winding core can be performed using various methods. Especially in ultrasonic welding, it is possible to make welding in a state where a temperature rise is relatively low. Further, even in the case of a member of aluminum or the like which is difficult to weld by resistance welding, it is possible to make joining by using the ultrasonic welding method.

In the ultrasonic welding method, heat generation occurs concentrically on an interface of metal so that a joining portion is formed, and temperature of the vicinity of the joining portion is also raised, so that it is preferable that the winding core is made of a material having high heat resistance, or only the upper portion of the winding core is made of a material having high heat resistance.

The winding core may be made of synthetic resin, such as polypropylene or polybutylene terephthalate, which is not corroded by an electrolyte.

Figure 6:
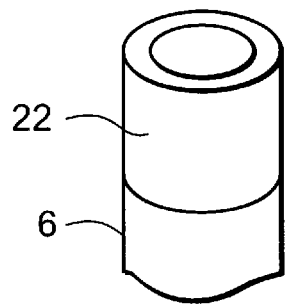
FIG. 6 is a perspective view showing an end portion of a winding core according to a first example adopted in a battery of the present invention.
Figure 7:
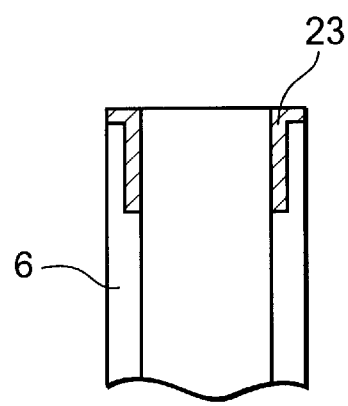
FIG. 7 is a sectional view showing an end portion of a winding core according to a second example adopted in a battery of the present invention.
Figure 8:
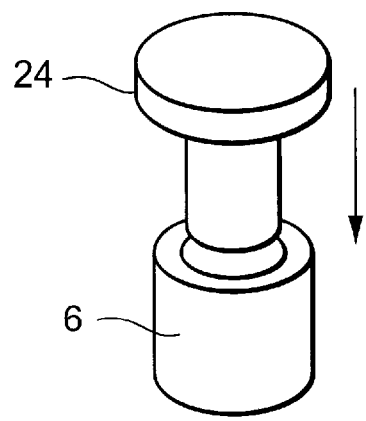
FIG. 8 is a perspective view showing an end portion of a winding core according to a third example adopted in a battery of the present invention.

FIG. 6 to FIG. 8 are views for explaining the winding core adopted for the battery of the present invention, and show only the upper portions thereof.

In the winding core 6 shown in FIG. 6, only its upper portion is formed of a metal material portion 22. This may be such that a pipe made of a metal material is fitted into the winding core 6, is screwed on an upper portion by a method such as screwing, or these materials are integrally molded at the time of molding the winding core 6.

FIG. 7 shows a winding core in which a metal pipe member 23 for an end portion, having an annular flange, is attached to the inside of a hollow pipe of the winding core 6 by a method such as fitting or screwing so that a metal material portion appears only at the end face of the winding core 6.

FIG. 8 shows a third embodiment of the winding core 6 in the present invention, and is for explaining a state in which a normal hollow pipe is used as the winding core 6, and a metal member 24 for a base is inserted in the end face of the winding core at a fabrication step of a battery. By such a method, since the whole surface of the upper portion of the winding core can be used as the base at the ultrasonic welding process, a welding operation is facilitated, and this is a desirable structure also in view of the improvement of reliability of welding.

It is preferable that the metal member portion 22, the metal member 23 for the end portion, or the metal member 24 for the base, as the upper portion of the winding core, uses a material which does not cause a corrosion reaction, a battery reaction, or the like with a metal material of an electrode lead coming in contact with the base. Besides, instead of the metal material, a heat-resistant material may be used. In the present invention, the heat-resistant material means a material having higher heat resistance as compared with a synthetic resin used for the winding core.

In the case where the electrode lead is a cathode lead, it is preferable to use a material, such as aluminum or titanium, as the above-mentioned metal material, and it is also possible to use various ceramic materials such as alumina or silica.

Although the foregoing description has been made on the case where the winding core is a hollow body, the winding core may be a rod-like body, and in this case, the whole surface of the end portion of the rod-like body can be used as a base. Also in the case where the rod-like body is used as the winding core, a metal member for a base may be attached to the end face of the rod-like body at the time of fabrication of a battery.

Figure 9A:
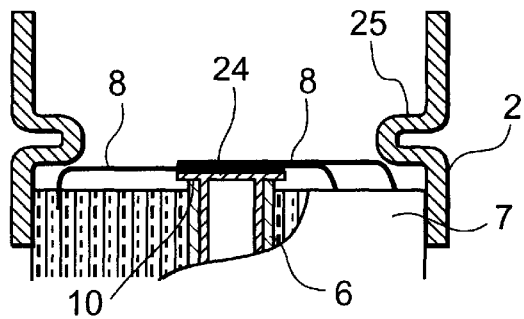
FIG. 9A to FIG. 9E are sectional views for explaining manufacturing steps of a battery according to the present invention.

Next, a method of manufacturing a battery of the present invention will be described with reference to FIG. 9A to FIG. 9E. The drawings show only the upper portion of the battery. First, as shown in FIG. 9A, a battery element 7 is housed in a battery can 2, and an upper portion of the battery can 2 is subjected to groove machining to form a stepped portion 25 protruding to the inside so that a gasket and a battery header can be supported thereby. Furthermore, after a predetermined amount of electrolyte is injected in the battery can, a metal member 24 for abase, which becomes a base for a joining portion, is attached to an opening portion at a center of a winding core 6. Next, a plurality of inner leads 8 are folded and are collected onto the metal member 24 for the base, which is an upper end portion 10 of the winding core 6.

Figure 9B:
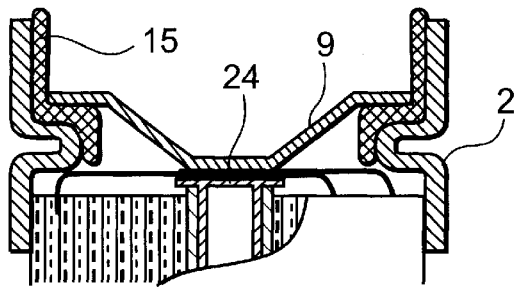

Next, as shown in FIG. 9B, a gasket 15 is fixed to the stepped portion 25 of the battery can, and a conductive connecting member 9 is inserted in the inside of the gasket 15.

Figure 9C:
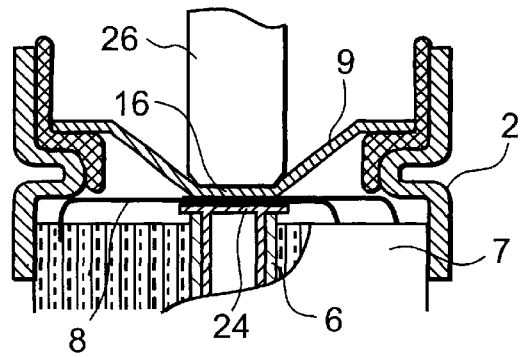

Next, as shown in FIG. 9C, a horn 26 of an ultrasonic welding machine is pressed to a joining portion 16 of the conductive connecting member 9 from the above, and ultrasonic waves are radiated to the joining portion 16 so that the inner leads 8 are welded to the joining portion 16 of the conductive connecting member 9 while the upper surface of the metal member 24 for the base is used as the base.

Figure 9D:
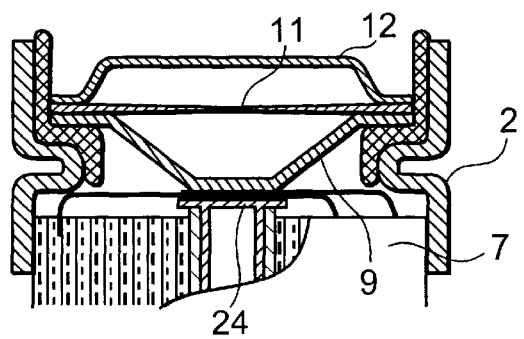

Next, as shown in FIG. 9D, a safety vent 11 in which its center portion is machined into a thin portion, and a cathode terminal 12 are put on the conductive connecting member 9.

Figure 9E:
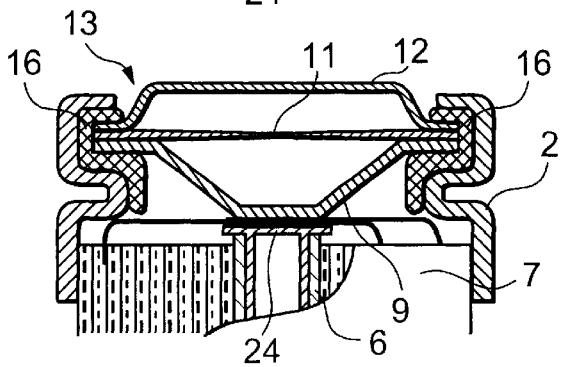

Furthermore, as shown in FIG. 9E, the upper portion of the battery can 2 is crimped to make conductive connection between the conductive joining portion 16 of the conductive connecting member 9 and the battery header 13, and the battery is sealed, so that the battery can be manufactured.

Although the above description has been made on the case where the battery header portion is formed of separate parts, the cathode terminal 12 and the safety vent 11 may be integrally manufactured in advance, and may be attached onto the conductive connecting member 9. Besides, in the battery header 13, a breaker for cutting off a current flow at the time of increase of inner pressure due to abnormality of the inside of the battery, a device for cutting off a current flow at the time of a temperature rise, or the like may be provided.

Besides, although the above description has been made on the battery in which the battery can serves also as an anode terminal and the battery header is a cathode terminal, it is needless to say that even for a battery in which a battery can serves also as a cathode terminal and a battery header is an anode terminal, the invention can be realized by making conductive connection of an anode lead to the battery header in the same manner.

As described above, according to the present invention, after a plurality of electrode leads attached to a battery element are joined to a conductive connecting member in the inside of a battery can by using a core portion of a winding core of the battery element, the conductive connecting member is brought into contact with a battery header to make conductive connection. Thus, a conductive connection step becomes simple, and IR loss or the like by an electrode lead for connection with a battery header portion can be decreased, so that it is possible to obtain a non-aqueous electrolyte secondary battery in which the IR loss is lowered, capacity density is large, and fabrication is easy, and which is suitable for mass production.

What is claimed is:

1. A non-aqueous electrolyte secondary battery comprising:
   a container for housing a rolled battery element provided with a winding core at a center portion;
   an external terminal member provided at a sealing side of said container and electrically connected to an inner lead connected to said battery element; and
   a plate conductive connecting member disposed between said external terminal member and said winding core, said connecting member being designed so as to fix said winding core in said container, and having a protruding surface to press said inner lead to an end face of said winding core to make electrical connection between said inner lead and said external terminal member.

2. A non-aqueous electrolyte secondary battery according to claim 1, wherein said end face of said winding core protrudes from a winding end face of said battery element to a side of said protruding surface, and said inner lead is connected between said end face of said winding core and said protruding surface of said connecting member.

3. A non-aqueous electrolyte secondary battery according to claim 1, further comprising a safety vent provided between said conductive connecting member and said external terminal member.

4. A non-aqueous electrolyte secondary battery according to claim 1, wherein a side of said conductive connecting member remote from said protruding surface includes an annular flange structure along an inner periphery of said container.

5. A non-aqueous electrolyte secondary battery according to claim 4, wherein said conductive connecting member includes a belt-shaped bridge member extending between said annular flange structure, and a center portion of said bridge belt-shaped member constitutes said protruding surface.

6. A non-aqueous electrolyte secondary battery according to claim 4, wherein said conductive connecting member has a funnel-shaped structure and a center portion constitutes said protruding surface.

7. A non-aqueous electrolyte secondary battery according to claim 6, wherein a slant surface between said protruding surface and said center portion of said annular flange structure includes a plurality of holes.

8. A non-aqueous electrolyte secondary battery according to claim 1, wherein said conductive connecting member is a belt-shaped member having said protruding surface at a center portion, and both ends of said belt-shaped member are respectively designed to form an arc along an inner surface of said container.

9. A non-aqueous electrolyte secondary battery according to claim 1, wherein said end face of said winding core is provided with a heat-resistant member.

10. A non-aqueous electrolyte secondary battery according to claim 9, wherein said heat-resistant member is a tubular member having an outer diameter equal to an outer diameter of said winding core so as to be coupled together.

11. A non-aqueous electrolyte secondary battery according to claim 9, wherein said heat-resistant member includes a flange portion having a cross section larger than a cross section of said winding core, and said flange portion is coupled to said end face of said winding core.

12. A non-aqueous electrolyte secondary battery according to claim 9, wherein said heat-resistant member includes a coupling portion inserted in and fixed to a hollow portion of said winding core and a plane portion for a base covering all said end face of said winding core.

13. A non-aqueous electrolyte secondary battery according to claim 1, wherein a protruding support portion for supporting both end portions of said conductive connecting member through a gasket is formed at said sealing side of said container, a safety vent is provided between said external terminal member and both said end portions of said conductive connecting member to constitute a battery header, and an end portion of said container at said sealing side is crimped to electrically connect said inner lead to said external terminal member.

14. A non-aqueous electrolyte secondary battery according to claim 13, wherein said protruding surface of said conductive connecting member is positioned between said protruding support portion of said container and said end face of said winding core.

15. A method of manufacturing a non-aqueous electrolyte secondary battery, comprising steps of:
   housing a rolled battery element including a winding core at a center portion and including an anode inner lead and a cathode inner lead into a container for a battery can so that an end face of said winding core is exposed at a sealing side;
   disposing one of said inner leads on said end face of said winding core and joining said one of said inner leads to a protruding surface of a conductive connecting member while said end face of said winding core is used as a base; and
   disposing and sealing an external terminal member at said sealing side of said container so that said external terminal member is electrically connected with an end portion of said conductive connecting member.

16. A method of manufacturing a non-aqueous electrolyte secondary battery according to claim 15, wherein said joining step is ultrasonic welding, said method further comprises a step of forming a support protrusion portion for supporting said conductive connecting member at an inner surface of said container prior to said ultrasonic welding step, and said ultrasonic welding is performed in a state where said conductive connecting member is held by said support protrusion portion.

17. A method of manufacturing a non-aqueous electrolyte secondary battery according to claim 16, wherein a cylindrical gasket is disposed between said support protrusion portion and said conductive connecting member, and said method further comprises a step of disposing said external terminal member on said conductive connecting member through a safety vent at an inside of said gasket, and a step of joining said external terminal member, said safety vent, and said conductive connecting member by crimping an opening end of said container together with said gasket.

18. A method of manufacturing a non-aqueous electrolyte secondary battery according to claim 17, further comprising a step of forming said base by joining a heat-resistant member to a winding core end face before said inner lead is positioned on said end face of said winding core, and a step of folding and disposing said inner lead on said heat-resistant member.

19. A non-aqueous electrolyte secondary battery according to claim 1, wherein a plurality of anode leads is connected to said inner lead, and a plurality of cathode leads is connected to an inner surface of said container.

20. A non-aqueous electrolyte secondary battery according to claim 1, wherein a plurality of cathode leads is connected to said inner lead, and a plurality of anode leads is connected to an inner surface of said container.

* * * * *

UNITED STATES PATENT AND TRADEMARK OFFICE
CERTIFICATE OF CORRECTION

PATENT NO. : 6,451,473 B1
DATED : September 17, 2002
INVENTOR(S) : Saito et al.

It is certified that error appears in the above-identified patent and that said Letters Patent is hereby corrected as shown below:

Column 2,
Line 59, "abase" should be -- a base --.

Signed and Sealed this

Thirtieth Day of March, 2004

JON W. DUDAS
*Acting Director of the United States Patent and Trademark Office*